US012663841B2

(12) United States Patent
Pallampati et al.

(10) Patent No.: US 12,663,841 B2
(45) Date of Patent: Jun. 23, 2026

(54) INTEGRATED CLICK PAD FRAME WIFI ANTENNA

(71) Applicant: DELL PRODUCTS L.P., Round Rock, TX (US)

(72) Inventors: Sumana Pallampati, Austin, TX (US); Chin-Ming Chang, New Taipei City (TW); Ching Wei Chang, Cedar Park, TX (US); Changsoo Kim, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 167 days.

(21) Appl. No.: 18/522,779

(22) Filed: Nov. 29, 2023

(65) Prior Publication Data

US 2025/0172977 A1 May 29, 2025

(51) Int. Cl.
*G06F 1/16* (2006.01)
*G06F 3/0354* (2013.01)
*H01Q 1/22* (2006.01)

(52) U.S. Cl.
CPC ............ *G06F 1/169* (2013.01); *G06F 1/1698* (2013.01); *G06F 3/03547* (2013.01); *H01Q 1/2266* (2013.01)

(58) Field of Classification Search
CPC ...... G06F 1/1656; G06F 1/169; G06F 1/1692; G06F 1/1698; H01Q 1/2266; H01Q 1/2291
See application file for complete search history.

(56) References Cited

U.S. PATENT DOCUMENTS

| | | | | |
|---|---|---|---|---|
| 6,339,400 B1* | 1/2002 | Flint | .................... | H01Q 1/2266 343/702 |
| 6,380,930 B1 | 4/2002 | Van Ruymbeke | | |
| 6,424,304 B1* | 7/2002 | Jan | ......................... | H01Q 1/243 343/702 |
| 6,509,877 B2* | 1/2003 | Masaki | ................ | H01Q 1/2266 343/702 |
| 6,531,985 B1* | 3/2003 | Jones | .................... | G06F 1/1616 343/702 |
| 6,538,606 B2* | 3/2003 | Quinn | ................... | G06F 1/1656 343/702 |
| 6,781,546 B2* | 8/2004 | Wang | ....................... | H01Q 1/38 343/702 |
| 6,809,690 B2* | 10/2004 | Tao | ......................... | G06F 1/1616 343/702 |
| 7,554,498 B1* | 6/2009 | Lee | ......................... | H01Q 5/371 343/702 |
| 10,606,323 B1* | 3/2020 | Chang | .................. | H05K 5/0226 |
| 11,296,399 B2 | 4/2022 | Hung et al. | | |
| 12,197,269 B2* | 1/2025 | Chang | ..................... | G06F 1/169 |
| 2003/0090469 A1* | 5/2003 | Tao | ......................... | G06F 1/1637 345/169 |
| 2003/0098813 A1* | 5/2003 | Koskiniemi | ......... | H01Q 9/0442 343/702 |
| 2006/0022957 A1* | 2/2006 | Lee | ..................... | G06F 3/03547 345/173 |

(Continued)

*Primary Examiner* — Adrian S Wilson
(74) *Attorney, Agent, or Firm* — Larson Newman, LLP

(57) ABSTRACT

A click pad frame is provided for holding a click pad device in an information handling system. The click pad frame includes a click pad device retainer portion and an antenna portion. The click pad device retainer portion and the antenna portion are fabricated from a single piece of sheet metal.

18 Claims, 4 Drawing Sheets

100

(56)　　　　　References Cited

U.S. PATENT DOCUMENTS

2006/0061512 A1*　3/2006　Asano ..................... H01Q 9/42
　　　　　　　　　　　　　　　　　　343/702
2006/0244663 A1*　11/2006　Fleck ................... G06F 1/1698
　　　　　　　　　　　　　　　　　　343/702
2010/0073241 A1*　3/2010　Ayala Vazquez .... H01Q 1/2266
　　　　　　　　　　　　　　　　　　343/702
2010/0321325 A1*　12/2010　Springer ............... H01Q 1/243
　　　　　　　　　　　　　　　　　　345/173
2011/0260931 A1*　10/2011　Tsai ........................ H01Q 9/04
　　　　　　　　　　　　　　　　　　343/893
2012/0032876 A1*　2/2012　Tabe ..................... H01Q 1/245
　　　　　　　　　　　　　　　　　　455/571
2012/0194393 A1*　8/2012　Uttermann ............ H01Q 1/526
　　　　　　　　　　　　　　　　　　343/702
2013/0057437 A1*　3/2013　Chiu ..................... H01Q 1/243
　　　　　　　　　　　　　　　　　　343/702
2013/0333919 A1*　12/2013　Nguyen .............. H05K 9/0015
　　　　　　　　　　　　　　　　　　174/126.1
2017/0162948 A1*　6/2017　Wong .................... H01Q 13/10
2018/0090822 A1*　3/2018　Wong ...................... H01Q 1/48
2018/0375189 A1*　12/2018　Hawaka ................. H01Q 1/526
2021/0343195 A1*　11/2021　Jung .................... G06F 1/1656
2022/0308636 A1*　9/2022　Hori ..................... G06F 1/1658
2023/0131026 A1*　4/2023　Kim ...................... H01Q 1/243
　　　　　　　　　　　　　　　　　　361/679.01
2023/0171932 A1*　6/2023　Yoon ........................ H04B 5/24
　　　　　　　　　　　　　　　　　　361/679.01
2023/0244294 A1*　8/2023　Chang .................. G06F 1/3287

* cited by examiner

INTEGRATED CLICK PAD FRAME WIFI ANTENNA

FIELD OF THE DISCLOSURE

This disclosure generally relates to information handling systems, and more particularly relates to an integrated click pad frame WiFi antenna in an information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A click pad frame may be provided for holding a click pad device in an information handling system. The click pad frame may include a click pad device retainer portion and an antenna portion. The click pad device retainer portion and the antenna portion may be fabricated from a single piece of sheet metal.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 1 illustrates a click pad frame for an information handling system according to an embodiment of the current disclosure;

The use of the same reference symbols in different drawings indicates similar or identical items.

DETAILED DESCRIPTION OF DRAWINGS

Figure 2:
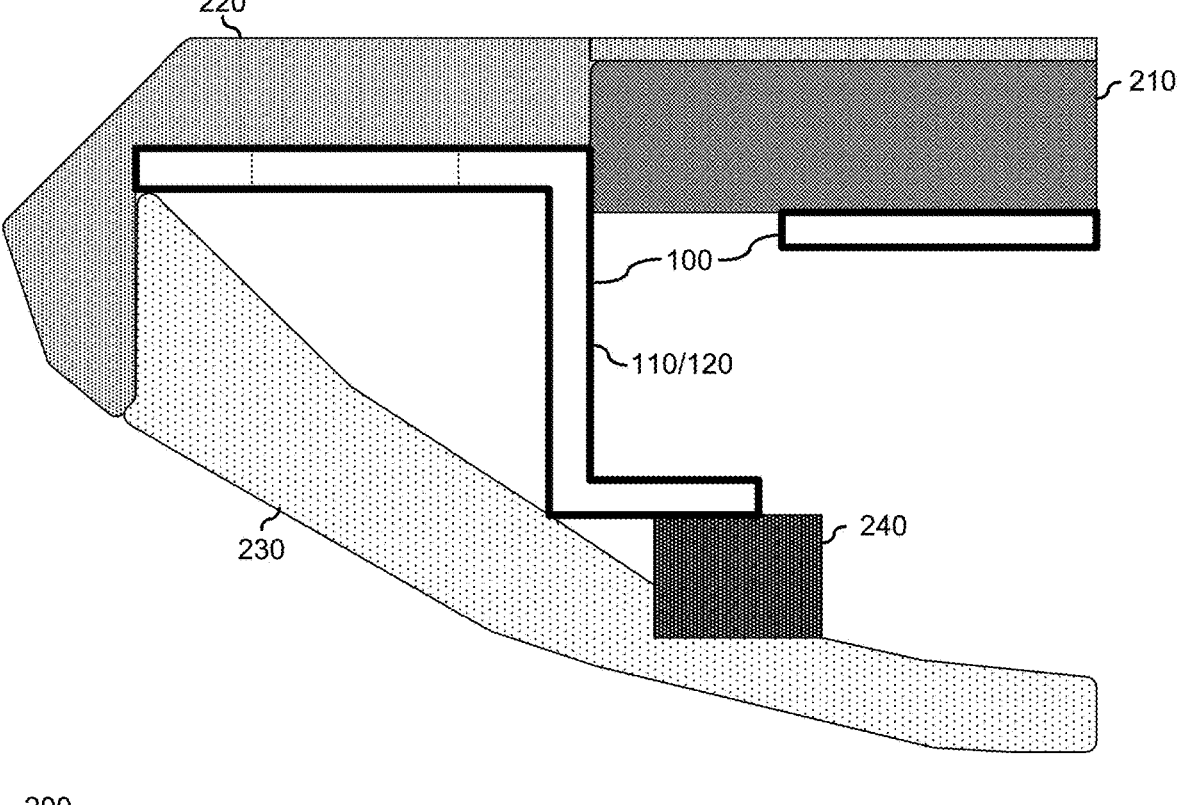
FIG. 2 is a side cut-away view of an information handling system including the click pad frame of FIG. 1.

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
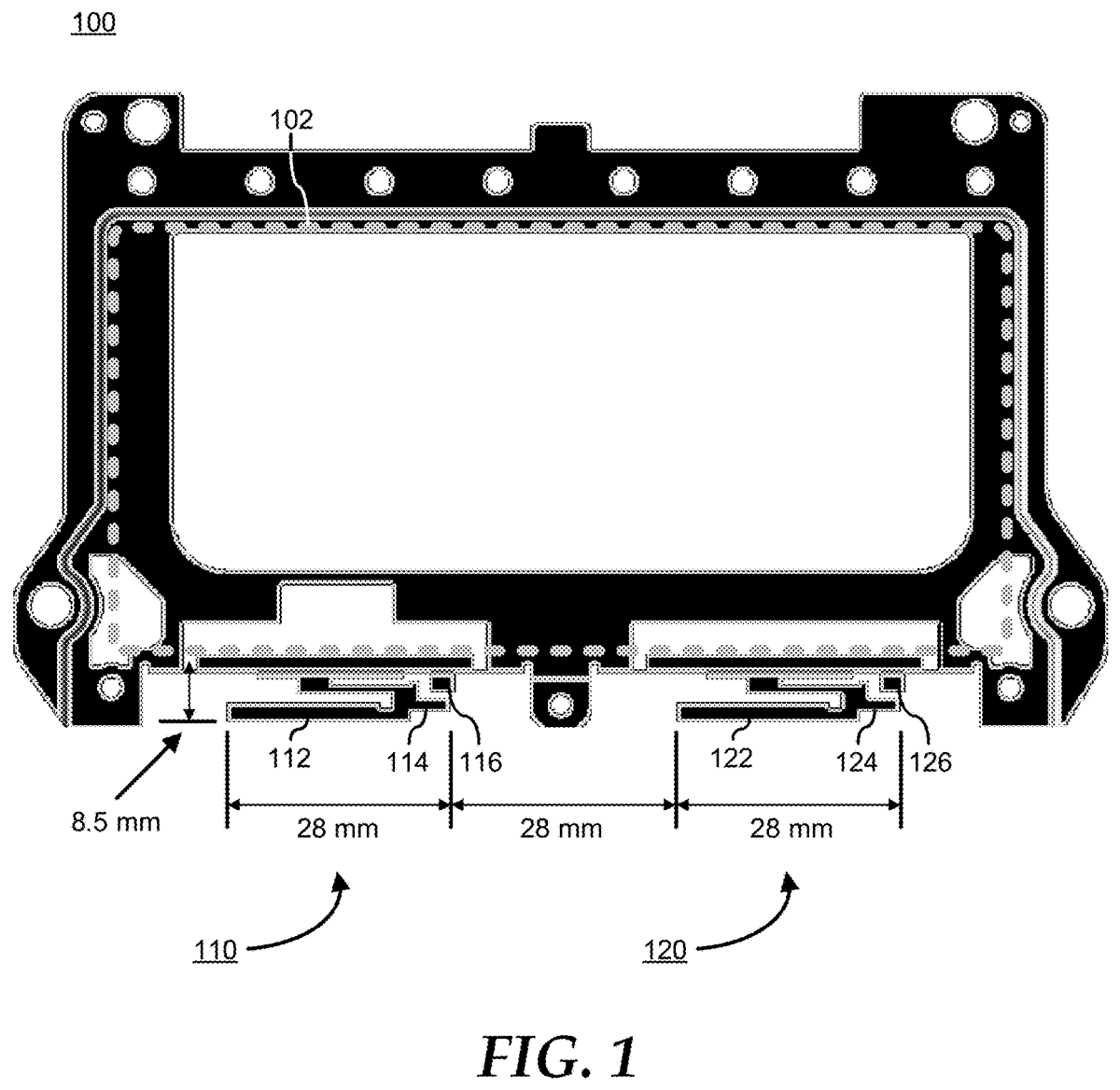

FIG. 1 illustrates a click pad frame 100. Click pad frame 100 represents a sub-frame of an information handling system, such as a laptop computer or the like, that is utilized to affix a click pad device to the information handling system. In particular, the click pad device is typically installed into click pad frame 100, and the assembly of the click pad device and the click pad frame is mounted to the under side of a cover of the information handling system. The cover typically includes a cutout that exposes the click pad device to permit a user to provide touch-based inputs to the information handling system. As such, the assembly of click pad frame 100 and the click pad device is typically located at a front edge of the cover of the information handling system.

The click pad device is preferably located in a recess 102 within the click pad frame 100, such that minimal adhesion is needed to secure the click pad device to the click pad frame. Click pad frame 100 is typically fabricated as a sheet metal element that is formed in one or more process step, including one or more stamping step that cuts a blank out of a larger sheet, one or more forging step that forms various profiles in the blank, and one or more folding step that forms various other profiles, as needed or desired. The details of fabricating click pad frames and assembling click pad devices within an information handling system are known in the art and will not be further described herein, except as may be needed to illustrate the current embodiments.

It has been understood by the inventors of the current disclosure that, with the move to higher display aspect ratios in laptop computers, longer embedded camera devices, and the adoption of 5G wireless support necessitating increasing numbers of embedded antennas, the interior space of the laptop computers is increasingly cramped. As such, any savings of space in one area permits greater functionality to be implemented. In particular, more space for the battery leads to longer battery life and greater user satisfaction.

A typical solution for embedding a greater number of 5G antennas may include the adoption of one or more antenna in the leading edge of the laptop computer case. For example, a common solution provides for two (2) 802.11ax (referred to as "6e") antennas formed on a plastic carrier and collocated at a front (that is, a user-ward side) of the click pad frame of the laptop computer. For example, the antennas can be formed using a laser direct structuring (LDS) fabrication with a ground plane provided by a flexible printed circuit (FPC) connected to the antenna structures. It has been further understood by the inventors that such an antenna structure is bulky, requiring around 11.5 mm of space in front of the click pad frame, and necessitates two (2) additional piece parts for the fabrication of the antenna structure (that is, the LDS antennas and the FPC ground plane), in addition to the click pad frame.

Returning to FIG. 1, click pad frame 100 includes antenna structures 110 and 120. Antenna structures 110 and 120 represent features formed integrally with click pad frame 100 during the process steps of fabricating the click pad frame. In particular, antenna structures 110 and 120 represent structures that form two (2) tri-band (2.4 GHz/5.0 GHz/6.0 GHz) 802.11ax antennas. Antenna structure 110 includes an antenna element 112, a signal contact pad 114, and a ground contact pad 116. Antenna structure 120 includes an antenna element 122, a signal contact pad 124, and a ground contact pad 126. Antenna elements 112 and 122 provide the radiating elements for radio frequency (RF) signals receive at respective signal contact pads 114 and 124. As such, antenna elements 122 may be configured with a length of 28 mm, or another length as needed or desired to achieve a desired antenna performance. Signal contact pads 114 and 124 are configured to receive the RF signals from an associated RF transmitter, and to provide RF signals received by respective antenna elements 112 and 122 to an associated RF receiver. Typically, the RF signals may be communicated through coaxial cables (not illustrated). In this case a center signal conductor of a first coaxial cable can be connected, such as by soldering, to signal contact pad 112, and a center signal conductor of a second coaxial cable can be connected to signal contact pad 122. Further, the shields of the first and second coaxial cables can be soldered to respective ground contact pads 116 and 126.

Being formed of the sheet metal piece part that forms click pad frame 100, antenna elements 110 and 120 are effectively grounded by the rest of the structure of the click pad frame, without the need for a separate FPC ground structure as described above. Moreover, by appropriately designing the spacings between antenna elements 112 and 122, for example, by providing a total length between the antenna elements so as to form a quarter wavelength distance between the antenna elements, energy radiated by an inactive one of the antenna elements when an active antenna element is transmitting is reduced. For example, where antenna elements 112 and 122 are provides with 28 mm lengths, the antenna elements can be located 28 mm apart, as illustrated. The inventors of the current embodiments have found that the current structure of antenna structures 110 and 120 may provide around 10 dB improved isolation over the LBS plastic antenna structure described above.

Further, the depth of antenna elements 110 and 120 may be reduced over the above-described LDS plastic antenna structure. For example, antenna elements 110 and 120 may have a depth of 8.5 mm, as opposed to the 11.5 mm LDS plastic antenna structure. The inventors of the current embodiments have found that the current structure of antenna elements 110 and 120 may afford up to 43% reduction in the volume over the LDS plastic antenna structure, volume that can be utilized for a larger battery, a larger motherboard, or for other components of the information handling system, as needed or desired. Moreover, integrating antenna structures 110 and 120 into click pad frame 100 results in a reduction of the piece part count of the information handling system.

Figure 3:
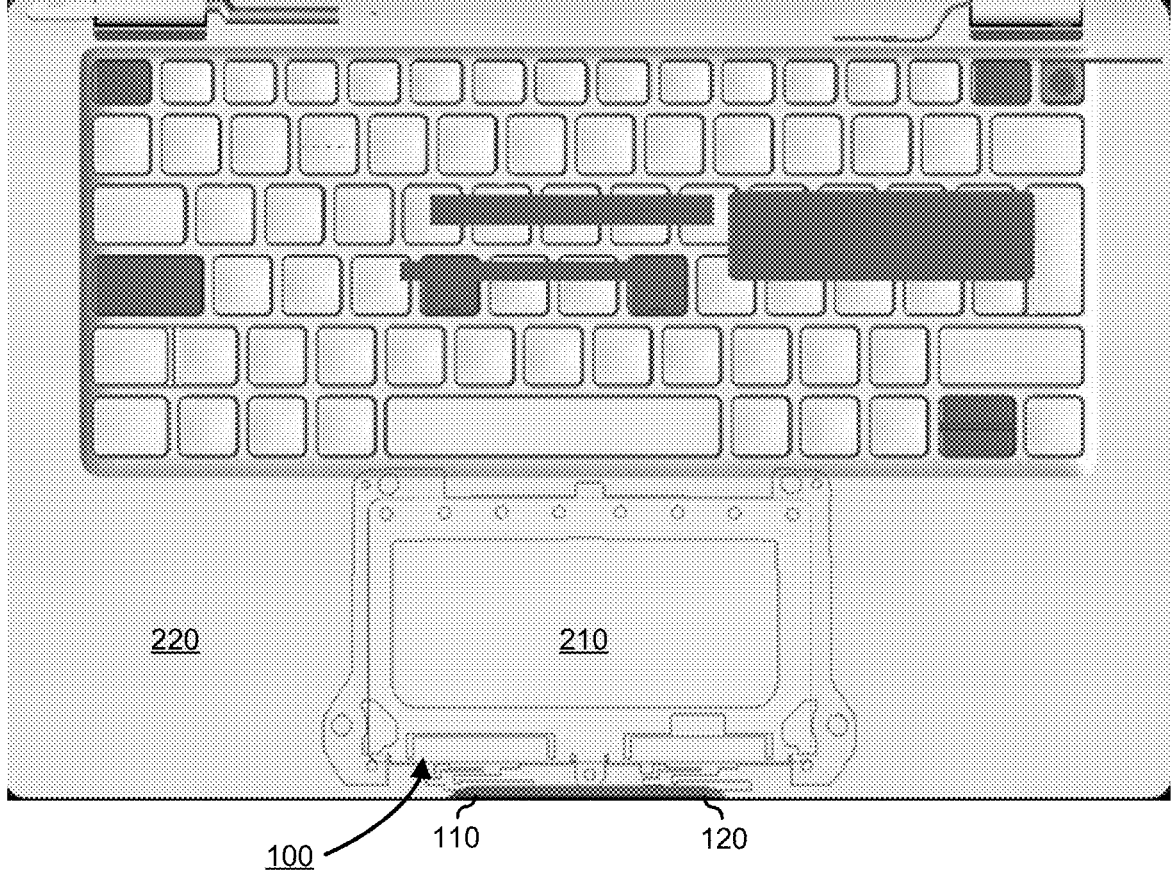
FIG. 3 is a top view of the information handling system of FIG. 2.

FIG. 2 shows an information handling system 200, including click pad frame 100 assembled with a click pad device 210 into a top cover 220 and a bottom cover 230 of the information handling system. Where bottom cover 230 is a metallic cover, a grounding gasket 240 further grounds click pad frame 100 to the bottom cover to provide greater antenna isolation. Moreover antenna structures 110 and 120 are shown as having a "Z" shaped profile. As such, the profile of antenna structure 110 and 120 act as a z-beam to stiffen top cover 220 to prevent the top cover from deforming when click pad device 210 is depressed or due to other stresses on the top surface of the top cover. Further, the :Z: shaped profile provides additional shielding of antenna structures 110 and 120 from stray signals from the other elements of the information handling system. FIG. 3 is a top view of information handling system 200, showing the location on a laptop computer of click pad frame 100, antenna structures 110 and 120, and click pad device 210.

Figure 4:
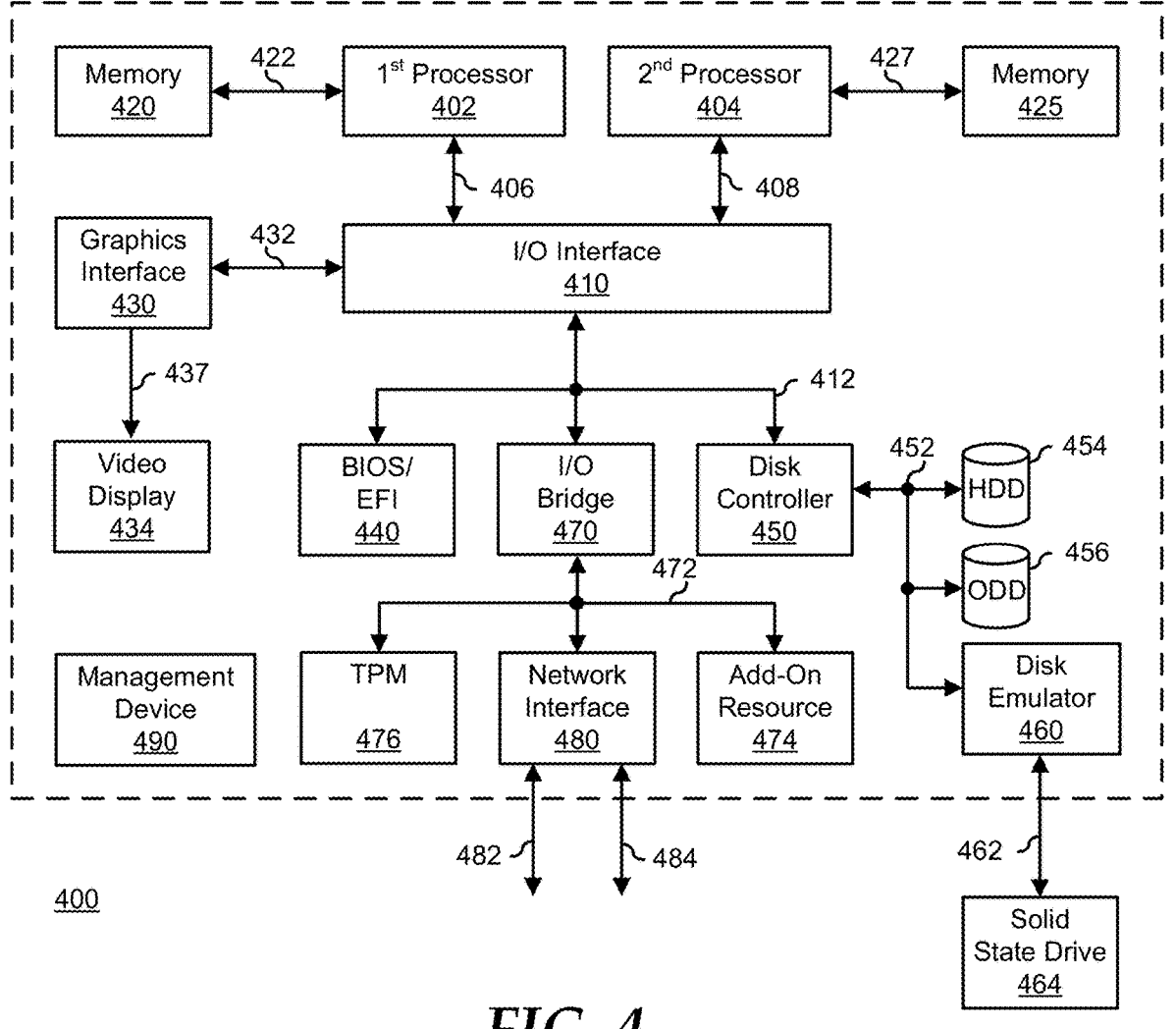
FIG. 4 is a block diagram illustrating a generalized information handling system according to another embodiment of the present disclosure.

FIG. 4 illustrates a generalized embodiment of an information handling system 400. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below, and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 464, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 464, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432, and provides a video display output 436 to a video display 434. In a particular embodiment, information handling system 400 includes separate memories that are dedicated to each of processors 402 and 404 via separate memory interfaces. An example of memories 420 and 425 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 2394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412, or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400. Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A click pad frame for holding a click pad device in an information handling system, the click pad frame comprising:

a recessed portion;

a first antenna portion; and a second antenna portion, wherein the recessed portion, the first antenna portion, and the second antenna portion are fabricated from a single piece of sheet metal, wherein the click pad frame is coupled to a metallic cover of the information handling system via a grounding gasket, and wherein a total length between the first antenna portion and the second antenna portion forms a quarter wavelength distance between the first antenna portion and the second antenna portion.

2. The click pad frame of claim 1, wherein the first antenna portion includes a first antenna element, a first radio frequency signal contact, and a first ground contact.

3. The click pad frame of claim 2, wherein the first antenna element is configured in accordance with at 802.11 specification.

4. The click pad frame of claim 3, wherein the antenna element is at least 28 mm long.

5. The click pad frame of claim 1, wherein the second antenna portion includes a second antenna element, a second radio frequency signal contact, and a second ground contact.

6. The click pad frame of claim 5, wherein the recessed portion forms a ground plane for the first antenna element and the second antenna element.

7. The click pad frame of claim 2, wherein the click pad frame is coupled to a metallic case to provide a ground plane for the first antenna element.

8. The click pad frame of claim 1, wherein the first antenna portion provides a support member for a case of the information handling system.

9. The click pad frame of claim 8, wherein the support member has a z-beam profile.

10. A method, comprising:

forming a click pad frame for holding a click pad device in the information handling system, the click pad frame being formed of a single piece of sheet metal;

forming, in the click pad frame, a first antenna portion for providing a first WiFi antenna forming, in the click pad frame, a second antenna portion for providing a second WiFi antenna, wherein a total length between the first antenna portion and the second antenna portion forms a quarter wavelength distance between the first antenna portion and the second antenna portion; and coupling the click pad frame to a metallic cover of the information handling system via a grounding gasket.

11. The method of claim 10, wherein the first antenna portion includes a first antenna element, a first radio frequency signal contact, and a first ground contact.

12. The method of claim 11, wherein the first antenna element is configured in accordance with at 802.11 specification.

13. The method of claim 12, wherein the antenna element is at least 28 mm long.

14. The method of claim 10, wherein the second antenna portion includes a second antenna element, a second radio frequency signal contact, and a second ground contact.

15. The method of claim 14, wherein the click pad frame forms a ground plane for the first antenna element and the second antenna element.

16. The method of claim 10, wherein the first antenna portion provides a support member for a case of the information handling system.

17. The method of claim 16, wherein the support member has a z-beam profile.

18. An information handling system, comprising:

a click pad device; and a click pad frame for holding the click pad device in the information handling system, the click pad frame including a recessed portion, a first antenna portion, and a second antenna portion, wherein the recessed portion, the first antenna portion, and the second antenna portion are fabricated from a single piece of sheet metal, wherein the click pad frame is coupled to a metallic cover of the information handling system via a grounding gasket, and wherein a total length between the first antenna portion and the second antenna portion forms a quarter wavelength distance between the first antenna portion and the second antenna portion.

* * * * *